Aug. 21, 1962    E. MARTIN    3,049,788
METHOD AND APPARATUS FOR FINISHING SURFACES
Filed Feb. 26, 1960    3 Sheets-Sheet 1
FIG.1.
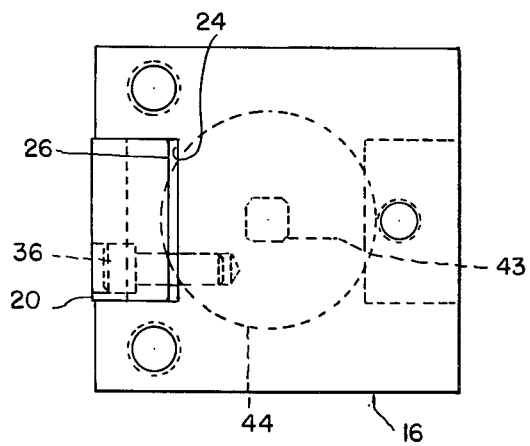
FIG.3.
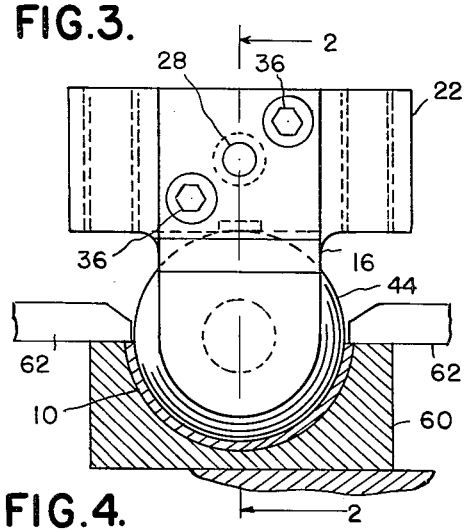
FIG.2.
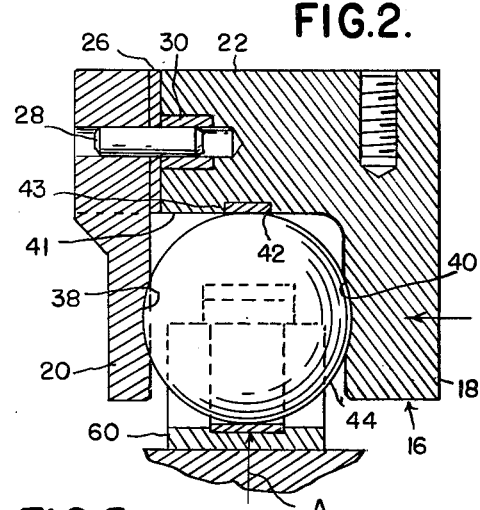
FIG.4.
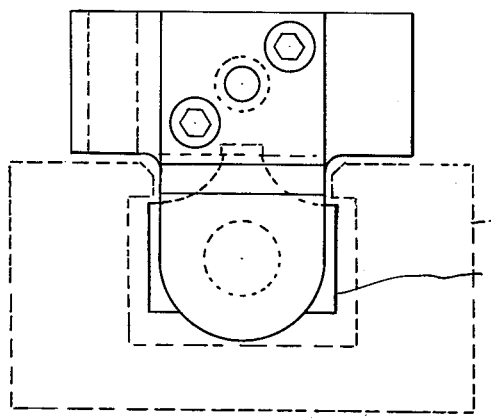
FIG.5.
FIG.6.
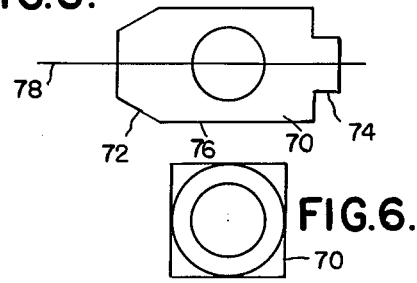
INVENTOR.
ERIC MARTIN
BY
Whittemore, Hulbert
& Belknap
ATTORNEYS

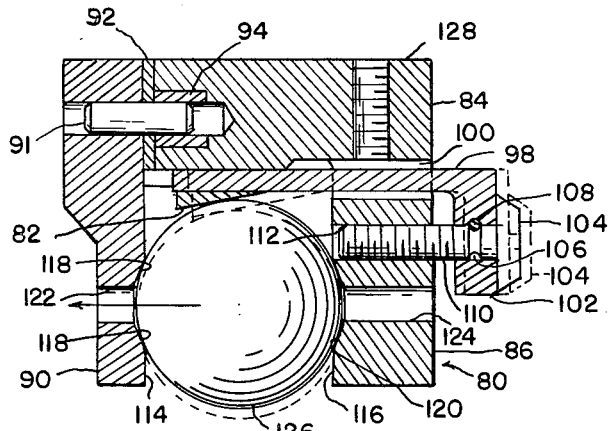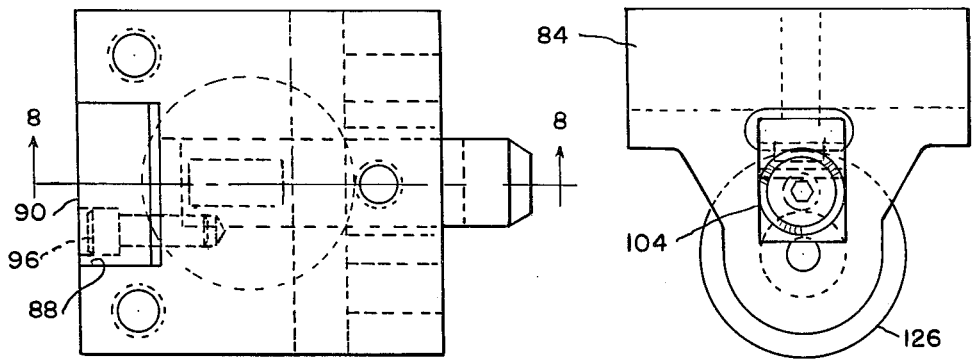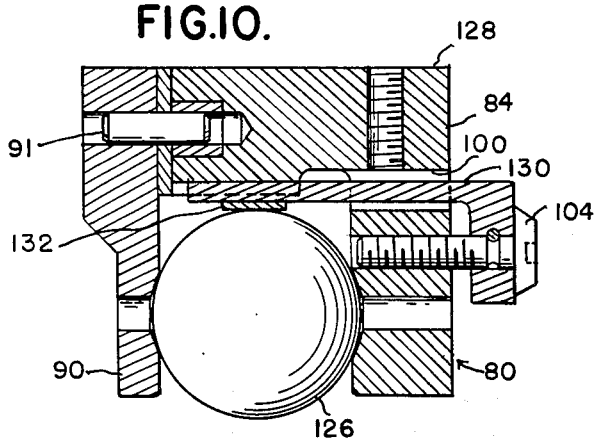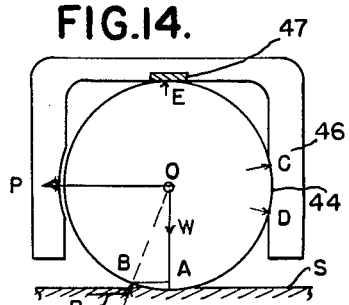
INVENTOR.
ERIC MARTIN

Aug. 21, 1962  E. MARTIN  3,049,788
METHOD AND APPARATUS FOR FINISHING SURFACES
Filed Feb. 26, 1960  3 Sheets-Sheet 3

INVENTOR.
ERIC MARTIN
BY Whittemore Hulbert
& Belknap
ATTORNEYS

3,049,788
METHOD AND APPARATUS FOR FINISHING SURFACES
Eric Martin, Dearborn, Mich., assignor to Omega Industries, Inc., Detroit, Mich., a corporation of Michigan
Filed Feb. 26, 1960, Ser. No. 11,369
3 Claims. (Cl. 29—90)

This invention relates to the method and apparatus for finishing surfaces. More particularly, this invention relates to a burnishing method and apparatus for finishing surfaces wherein a caged ball or other means is utilized to remove the discrepancies in the surface of the work piece to be finished.

It is an object of the present invention to provide a method and apparatus for removing machine discrepancies from the surfaces to be finished.

It is another object of the present invention to provide a unique method and apparatus for removing the minute ridges and alternate valleys in the surface of the work piece to be finished by employing a caged ball retainer and moving either the work piece or the retainer relative to the other so as to push the ridges over into the valleys to effect a smoother finish surface.

Still another object of the invention is to provide an improved method for removing the minute ridges and alternate valleys in the surface of the work piece to be finished by utilizing a caged ball retainer, fixing the work piece and moving the caged ball retainer across the surface so as to apply an evenly distributed burnishing pressure thereto thereby pushing the ridges on the surface over into valleys to effect a smoother finish surface.

A further object of the invention is to provide an improved apparatus for finishing machined surfaces, said apparatus comprising a burnishing member and means for retaining said member in a caged position when finishing said surfaces.

A still further object of the invention is to provide an improved burnishing tool for finishing curved machined surfaces, said tool comprising a spherical burnishing member and means for retaining said member in a caged position when finishing said surfaces.

Another object of the invention is to provide an improved burnishing tool for finishing a curved machined surface which is less than 360 degrees, said tool comprising an accurately finished spherical ball and caging means for retaining said ball so that the ball may rotate as it moves across the surface to be finished.

Another object of the invention is to provide an improved burnishing tool for finishing a curved machined surface which is less than 360 degrees, said tool comprising an accurately finished spherical ball and caging means for retaining said ball so that the ball may rotate as it moves across the surface to be finished and adjustment means for varying the location of the ball in said caging means or for utilizing different size balls.

A further object of the present invention is to provide a machine having a caged burnishing finishing tool in combination with a cutting tool.

A still further object of the present invention is to provide a machine having a movable slide and means for mounting a cutting tool and a caged burnishing tool on said slide in such a manner as to perform the initial cutting operation on the surface to be finished and then finishing the surface by moving the caged burnishing tool thereacross so as to remove any machining discrepancies.

Another object of the present invention is to provide an improved and simplified method and apparatus of the aforementioned type for accurately finishing machined surfaces and having certain advantages contributing to efficiency, reliability and long life and which is fast, economical and provides accurate production advantages.

Other objects and features of the invention will become apparent as the description proceeds, especially when taken in conjunction with the accompanying drawings, illustrating a preferred embodiment of the invention, wherein:

FIGURE 1 is a plan view of an embodiment of the present invention.

FIGURE 2 is a sectional elevational view taken on line 2—2 of FIGURE 3.

FIGURE 3 is the left end view of the invention shown in FIGURES 1 and 2.

FIGURE 4 is a left end view, similar to the one shown in FIGURE 3 with the exception that a flat burnishing member is utilized therein for the purpose of finishing splines and the like.

FIGURE 5 is a plan view of the burnishing member shown in FIGURE 4.

FIGURE 6 is the left end view of the member shown in FIGURE 5.

FIGURE 7 is a plan view of another embodiment of the present invention.

FIGURE 8 is a sectional elevational view taken on line 8—8 of FIGURE 7.

FIGURE 9 is a right-hand end view of the invention shown in FIGURES 7 and 8.

FIGURE 10 is a sectional elevational view showing a modification of the adjustment feature as disclosed in FIGURES 7-9.

FIGURE 14 is a simplified front view of the ball caged retainer showing the various forces acting thereon.

This invention will be primarily discussed in this application to the finishing of split bearings wherein the bearing surfaces each have a circumference extending approximately 180 degrees. However, this invention has many other applications including the finishing of flat surfaces and curved surfaces having a circumference of less than 360 degrees.

The method as disclosed herein shows that an accurately finished spherical ball is caged and, unlike other methods wherein a ball is used for sizing, it is possible not only to obtain a precision and accurately finished surface but in addition thereto, the finished ball has the ability to rectify machining errors.

Figure 11:
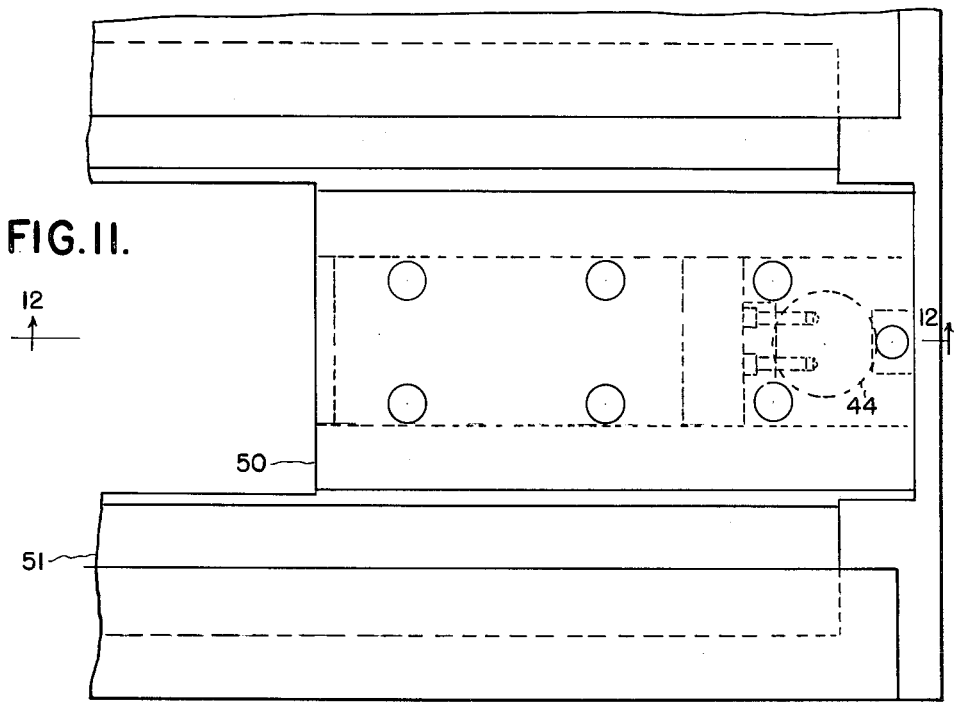
FIGURE 11 is a plan view of a broaching machine having the present invention mounted on the broach slide.
Figure 12:
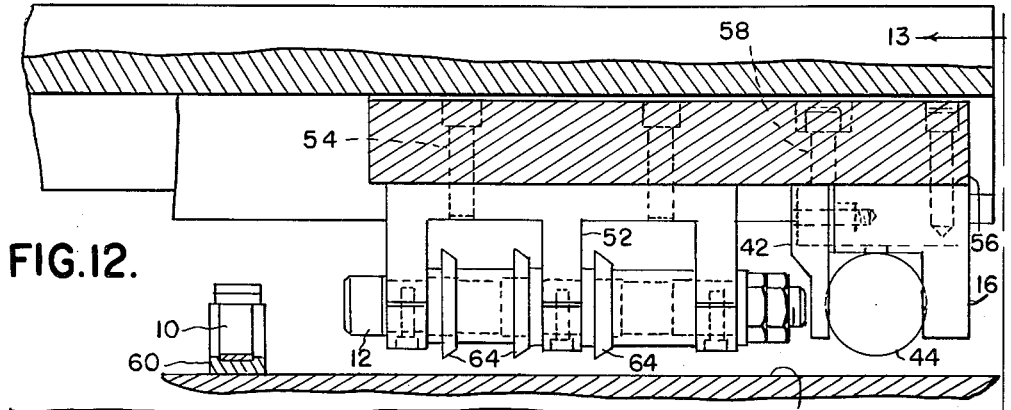
FIGURE 12 is a sectional elevational view taken on line 12—12 of FIGURE 11.
Figure 13:
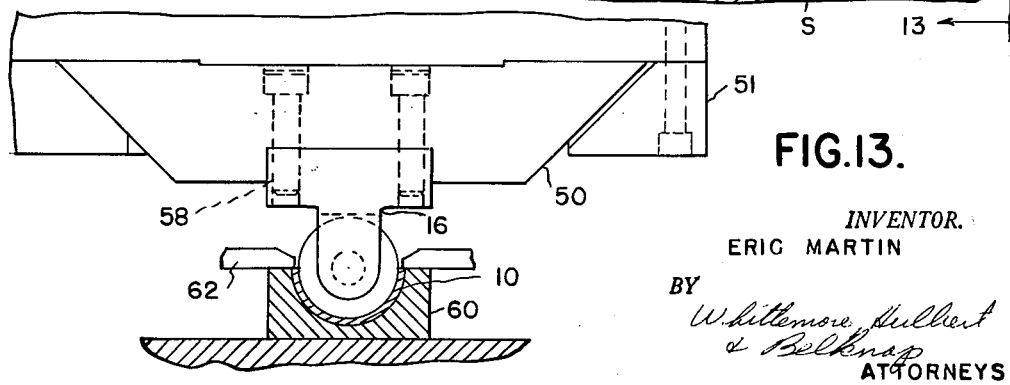
FIGURE 13 is an end view of the broach slide having the present apparatus mounted thereon for finishing a bearing surface.

Let us consider for a moment the action of a cutting tool encountering the surface to be finished. As an example, consider the semi-cylindrical bearing 10 and the broach 12 as shown in FIGURES 11-13. Various types of machine operations, including broaching, leave minute ridges and alternate valleys in the surfaces of the metal to be finished. These alternate ridges and valleys are formed even though the broach utilizes rough and finishing sections. If the piece to be finished is burnished, the pressure of the burnisher pushes the ridges over into the valleys to effect a smoother finish surface. The proposed method and apparatus has the ability to rectify the machining errors as caused by the cutting tool and to properly size the surface. This is accomplished by burnishing the surface with a caged ball retainer wherein the metal flows into the excessive tool grooves or marks.

In recent years, many surfaces have been finished through broaching operations. It is largely agreed in the industry that metal cutting is very largely dependent on the tools and fixtures involved. In other words, a good broaching machine or other finishing machine is necessary but certainly not sufficient. Even with a good broaching machine when it is equipped with make-shift fixtures and supplied with mediocre broaches, only indifferent performance records can be achieved. However, utilizing that same machine with ingeniously designed fixtures and first-grade tools will deliver or provide better performance. However, the minute ridges and alternate valleys are not entirely eliminated through this method which is achieved only at considerable cost.

Utilizing the example stated previously, namely the semi-cylindrical bearing 10 and the broach element 12, it has been found that the exclusive use of broaching to produce the finished surface by utilizing roughing and finishing operation was not the complete answer to the problems hereinbefore stated.

It was found that by broaching the bearing 10 exclusively, the specified tolerances and surface finish could be held only for relatively short runs although the placement broaches, particularly the finishing sections, could be replaced at any time to duplicate accurately the dimensions of the initial units. It was further found that the shutdown time of the machine was excessive and that approximately 1500 bearings could be produced per hour with one broach bar, after which time the broach finishing section had to be changed. This required additional labor and time to realign or to set up subsequent operations.

The new method and apparatus has overcome this problem by not only providing the surface finish required but also rectifying any machining errors. This is accomplished without the excessive shutdown time in replacing the broach finishing section and permits savings in labor and elimination of many of the maintenance problems.

In essence, the applicant utilizes a novel caged bearizing principle for burnishing the surface to be finished. This is accomplished by utilizing a cage bearizer which rectifies the machining errors produced in the surface by a broach or other cutting tool.

Although this invention will be described in its application to a broaching machine, it should be understood that it may be mounted on other machines or, in fact, may be mounted independently of the initial cutting tool so that it can move in a line exactly parallel to the surface to be finished. In addition, the bearizer, that is the caged ball retainer, could remain stationary while the work piece to be finished is moved on a conveyor line or through other means with reference to the stationary bearizer.

One of the embodiments of the invention as shown in FIGURES 1–3 consists of retainer 16 which is substantially U-shaped in cross-section as shown in FIGURE 2. Retainer 16 comprises a downwardly extending flange portion 18 and a side plate or enclosure member 20.

The upper portion 22 of the retainer 16 has a slot 24 in which is located the side plate 20. Positioned in the slot adjacent to the inner surface of the side plate 20 is a shim 26. A dowel pin 28 extends through the side member 20 and shim 26 and is received in the bushing 30 which is retained in the upper portion 22 of the retainer 16. In addition, a pair of threaded bolts 36, as shown in FIGURE 3, are utilized to retain the side member 20 in a fixed position with the upper portion 22. The inner surfaces of side member 20 and the downwardly extending portion 18 have spherically and accurately formed surfaces 38 and 40 respectively. The lower surface 41 of the upper portion 22, which forms with the inner surfaces of the downwardly extending members 18 and 20 the U-shaped portion, has a recess 42 therein in which is inserted a carbide insert 43 which is brazed in place. Prior to the side member 20 being connected to the upper portion 22, the finishing ball 44 is positioned so as to engage the carbide insert 43 and the spherically finished surface 40. The side member 20 is then positioned so as to engage one portion of the spherical ball 44 thereby completing the retainer 16. This is clearly shown in FIGURE 2.

When the ball retainer 16 is not in contact with any surface, the ball 44 has the ability to float within the retainer 16. In other words, a force may be applied to the ball at any one of an infinite number of places thereon and the ball will rotate about its axes in the direction of the force. The eccentricity problem of the ball 44 in relation to the surface to be finished becomes non-critical because of the ability of the ball to float thereby automatically centering itself within the retainer 16. In addition, the ability of the ball to float makes up for any misalignment of the broach bar.

However, once the burnishing tool is brought into engagement with the surface to be finished and is moved across said surface, the ball 44 is considered to be caged within the retainer 16. As an example, consider the structure shown in FIGURE 14. The ball 44 is shown in a simplified U-shaped retainer 46 which includes a pair of downwardly extending legs, each having an accurately finished spherical portion. The rigid ball 44 carries a vertical load W due in part to its own weight and rests on the rigid horizontal surface S. A horizontal force P, however small, will cause the ball 44 to roll on the surface S. If the ball rolls over the surface S, which has minute ridges and alternate valleys therein, a resistance to the motion is encountered owing to the fact that the surface immediately in front of the ball is being deformed so as to push the ridges into the valleys. The horizontal force P will cause the center of the ball O to move with a constant velocity. Since the surface S on which the ball 44 rolls deforms under the ball 44, the pressure between the ball and the surface is distributed over the area of contact. The resulting pressure, or reaction R of the surface on the ball passes through point B in the area of contact as shown in FIGURE 14. The horizontal component of the reaction R is equal to P and is normally called the rolling friction or rolling resistance. The rolling resistance $R_H$ tends to move the ball 44 to the right so that part of the spherical surface of the ball 44 engages the spherical portion of the retainer 46 at points C and D. In addition, the reaction of the surface S creates a vertical upward force so as to move the ball into contact with the carbide insert 47 at point E as indicated in the same figure. In this position, the ball 44 is considered to be caged within the retainer 46. As the retainer 46 moves across the surface S to be finished, the ball 44 is caged but is permitted to rotate about its center O due to the forces acting thereon. The other spherical portion of the retainer is out of contact with the ball 44 when the above described operation takes place. The clearance therebetween is exaggerated as shown in FIGURE 14.

As mentioned previously, the ball caged retainer 16 may be mounted on the horizontal slide of a broaching machine or upon another cutting machine. In addition, the ball caged retainer 16 may be mounted independently on its own frame in such a manner as to have a reciprocating action with respect to a fixed surface. One example of the way in which the ball caged retainer 16 may be mounted is shown in FIGURES 11–13. A horizontal reciprocating slide 50 is mounted in the frame 51 of a broaching machine, which is only partly shown, in a conventional manner. The slide 50 is adapted to carry a broach fixture 52 and adjacent thereto the ball caged retained 16. The broach fixture 52 is retained or connected to the slide by bolts 54. The upper surface 56 of the retainer 16 has a plurality of holes so that the retainer 16 may be connected to the slide 50 through bolts 58. Mounted immediately below the slide 50 on the broaching machine surface S is a fixture 60. Fixture 60 has clamping or locating means 62 thereon which provides means for holding the semi-cylindrical bearing 10 in a fixed position in the fixture 60 with reference to the reciprocating slide 50. The broach-holder 52 has the broach 12 mounted thereon which is adapted to carry the rough finishing cutters 64.

After the machine operator has placed the bushing 10 in the fixture 60 and has clamped the bushing 10 in a fixed position by means of locating means 62, the slide 50 is reciprocated from right to left as shown by FIGURE 12, so that the broach 12 is moved across the bearing 10 so as to rough finish the bearing surface with the cutters 64. The ball caged retainer 16, which is mounted behind and adjacent to the broach 12 is then, during the same reciprocation of the slide 50, moved across the bearing surface 10 so as to eliminate the machining errors placed therein by the cutters 64. In other words, the minute hills and alternate valleys are smoothed by the burnishing operation of the caged ball 44. As the ball 44 engages the bearing 10, a vertical force due to the reaction of the bearing surface, pushes the ball 44 against the carbide insert 42 so as to maintain the distance from the bottom of the ball to the upper surface 56 constant or fixed.

From such description, it is apparent that the bearing 10 is initially accurately located in the fixture 60 so as to remove some of its internal surface through the broaching operation after which time the ball caged retainer 16 is moved across the bearing 10. Since the upper surface 56 of the retainer 16 is maintained at a fixed distance with reference to the bottom of the ball 44, the tolerances of the finished bearing 10 is accurately maintained unlike other methods where balls are used for sizing. It is permissible with this method, not only to finish the surface, but to rectify the machining errors placed therein by the broach cutters 64.

Experimentation has shown that the broach cutters 64 are subjected to wear. However, the distance between the bottom of the accurately finished spherical ball 44 and the slide 50 is maintained at a fixed distance. Therefore, within machining limitations, regardless of the amount of the rough cut taken from the internal surface of the bearing 10, it is apparent that as long as the distance from the slide 50 to the bottom of the ball 44 is maintained, the exact bearing tolerances will be maintained.

Although the invention has so far been described in reference to the finishing of a semi-cylindrical bearing, it should be understood that this invention also has other applications including the finishing of splines. Instead of utilizing an accurately finished spherical ball 44, a substantially rectangularly-shaped finishing member 70 may be utilized. This member is shown in FIGURES 4–6. FIGURE 4 shows a burnishing member 70 mounted in a retainer similar to retainer 16, as previously described. Means are provided on the inner surfaces of the downwardly extending members 18 and 20 so as to carry the end portions 72 and 74. After the broach is moved across the surface of the spline 73, the finishing member 70 is moved across the surface to be finished so as to remove the minute hills and alternate valleys contained therein. The surface 76 is an accurately finished flat surface which moves across the spline surface. The burnishing member 70 is permitted to rotate therein on the horizontal axis represented by the numeral 78. This slight rocking motion about the axis 78 is essential to eliminate sliding between the spline and the finishing surface 76.

Another modification of the invention is shown in FIGURES 7–9. The ball retainer 80 is somewhat similar to the retainer 16 as previously described, however, there are several features incorporated therein which are not present in the other embodiments. Means are provided for adjusting the height of the tapered carbide insert as represented by numeral 82. The retainer 80 consists of an upper portion 84 which has a downwardly extending flange 86.

In addition, the upper portion 84 has a cut out portion 88 which receives the closure or side member 90 as is best shown in FIGURE 7. The side member 90 is connected to the upper portion 84 through the doll pin 91 which extends through the side member 88 and the replaceable shim 92. The pin 91 is received in the bushing 94 which is retained in the upper portion 84 of the retainer 80. Bolts 96 retain the side member 90 in a fixed position in the upper portion 84. Means are provided for adjusting the setting of the tapered or slanted carbide insert 82 which is carried by the member 98. The member 98 extends through an opening 100 provided in the retainer 80 and is designed to have a downwardly extending flange 102. Mounted on the outside of the flange 102 is an adjustment indicator 104 which has a groove 106 therein around which is placed an O-ring 108 which locates the member 104 with reference to the member 98. The adjustment indicator 104 has a threaded shaft 110 which extends inwardly into the threaded flange opening 112 in the retainer 80. Rotation of the adjustment member 104 will move the shaft 110 in or out of the threaded portion 112 so as to move the member 98 and hence the tapered or slanted insert 82 either to the left or to the right depending on the direction in which the adjustment is made.

The inner surfaces of the members 86 and 90, as represented by the numerals 114 and 116, each have a pair of flats 118 and 120 respectively, machined therein. These flats represent the surfaces where the ball 126 has its point of tangency. The flats 118 terminate at an opening 122 which extends through the member 90. The flats 120 terminate inwardly at a point where they engage the opening 124 which extends outwardly through the member 86.

When it is desirable to obtain different tolerances or a different thickness of finish on the bearing 10, or when it is desirable to finish other pieces, the position or location of the ball 126 in the retainer 80 may be changed by the adjustment member 104. Movement of the member 104 will move the horizontal member 98 accordingly so as to position the slanted insert 82 at a different height relative to the ball 126. Since the distance from the top surface 128 of the retainer 80 to the bottom of the ball 126 is accurately maintained with reference to the surface to be finished, the raising or lowering of the ball 126 would effect the tolerance of the finished surface. The increments on the adjustment member 104 may be graduated to obtain readings of plus or minus one ten-thousandths. If it is desirable to raise or lower the ball 126, .0003", the surface to be finished would be accordingly changed with reference to the drop or raise of the ball 126. After the broaching operation, or other machining operation, has been completed and it is desirable to perform the finishing or bearizing operation, retainer 80 is moved across the bearing surface. The force exerted on the bottom of the ball 126 moves the ball upwardly so as to contact the slanted insert 82 and simultaneously creates forces at the points of tangency between the ball 126 and the flat surfaces 120. When in this position, the ball 126 is said to be in a caged position as previously described.

FIGURE 10 shows another modification of the invention as shown in FIGURES 7–9. Basically, instead of utilizing a tapered carbide insert, the member which carries the carbide is tapered. The structure is similar to FIGURE 8 and includes the retainer 80 which has the tapered member 130 extending through the passage 100 in a similar manner as described in FIGURE 8. The tapered member 130 carries the carbide insert 132. Adjustment of the tapered member 130 and hence the insert 132 is effected by the adjustment mechanism 104 which is identical with the one previously described. When it is desirable to change the position of the ball 126 in the retainer 80, adjustment is effected by rotating the member 104 so as to move the tapered member 130 accordingly.

It is readily apparent from reading the specification that the applicant has provided a unique method and apparatus for improving the microfinish of a metal surface and increasing the dimensional accuracy of the surface.

The drawings and the foregoing specification constitute a description of the method and apparatus for finishing surfaces in such full, clear, concise and exact terms as to enable any person skilled in the art to practice the invention, the scope of which is indicated by the appended claims. What I claim as my invention is:

1. A burnishing tool comprising a housing having a base and a pair of spaced flanges connected to and defining with said base a ball receiving opening, an accurately finished spherical ball mounted in said opening for rotary movement in a vertical plane which is perpendicular to said flanges, said ball projecting beyond said flanges for engagement with a surface to be finished, a groove in the bottom wall of said base parallel to the aforesaid vertical plane, an element movable in said groove and having a portion which is tapered in engagement with said ball when said tool is in operation, and means for moving said element in said groove to regulate the depth of said ball in said housing when said tool is in operation.

2. A burnishing tool comprising a housing having a base and a pair of spaced flanges connected to and defining with said base a ball receiving opening, an accurately finished spherical ball mounted in said opening for rotary movement in a vertical plane which is perpendicular to said flanges, said ball projecting beyond said flanges for engagement with a surface to be finished, a groove in the bottom wall of said base parallel to the aforesaid vertical plane, an element extending through one of said flanges into said groove, said element having a portion which is tapered in engagement with said ball when said tool is in operation, said element having an arm exterior of said one flange, and a threaded adjustment member carried by said arm and in threaded engagement with said one flange, said threaded adjustment member being effective to move said element in said groove to vary the position of said tapered portion with respect to said ball and thereby regulate the depth of said ball in said housing when said tool is in operation.

3. A burnishing tool defined in claim 2 wherein said element carries a carbide insert which is located directly opposite from said ball.

References Cited in the file of this patent

UNITED STATES PATENTS

| | | |
|---|---|---|
| 2,522,084 | Baruch | Sept. 12, 1950 |
| 2,585,166 | Phanenf | Feb. 12, 1952 |
| 2,906,004 | McVey | Sept. 29, 1959 |

FOREIGN PATENTS

| | | |
|---|---|---|
| 495,721 | Belgium | May 31, 1950 |
| 678,070 | France | Dec. 23, 1929 |
| 923,953 | Germany | Feb. 24, 1955 |